United States Patent [19]

Reich et al.

[11] 4,207,598

[45] Jun. 10, 1980

[54] AUTOMATIC MAIL SENDING SYSTEM

[75] Inventors: Hans Reich, Ludwigsburg; Ekkehard Bajohr, Vaihingen, both of Fed. Rep. of Germany

[73] Assignee: International Standard Electric Corporation, New York, N.Y.

[21] Appl. No.: 590,803

[22] Filed: Jun. 27, 1975

[30] Foreign Application Priority Data

Jul. 5, 1974 [DE] Fed. Rep. of Germany ....... 2432398

[51] Int. Cl.² .............................................. H04N 7/16
[52] U.S. Cl. ..................................... 358/257; 358/86; 358/259; 179/2 TV; 455/38
[58] Field of Search .................. 179/2 TV; 178/6, 6.8; 358/86, 256, 257, 259; 325/4, 55, 64; 343/100 ST; 340/146.3 F, 146.3 H

[56] References Cited

U.S. PATENT DOCUMENTS

| 2,290,317 | 7/1942 | Deakin | 358/256 |
|---|---|---|---|
| 3,594,495 | 7/1971 | Bond | 358/257 |
| 3,790,159 | 2/1974 | Hatzmann et al. | 358/286 |
| 3,914,539 | 10/1975 | Hashimoto | 358/257 |
| 3,920,895 | 11/1975 | Vieri et al. | 358/257 |

*Primary Examiner*—Robert L. Griffin
*Assistant Examiner*—Edward L. Coles
*Attorney, Agent, or Firm*—James B. Raden; Marvin M. Chaban

[57] ABSTRACT

For sending mail automatically, letters put in a sending station uncovered are scanned with a television camera tube, and the information is transmitted to storages in a telephone exchange. In the exchange, a numerical destination address written at a specified point is evaluated. With the aid of this destination address a path to the destination is set up automatically, preferably at night when there is little traffic, and the letter information is then transmitted. At the receiving station the information is reproduced and the letter is sealed before being delivered to the addressee.

6 Claims, 3 Drawing Figures

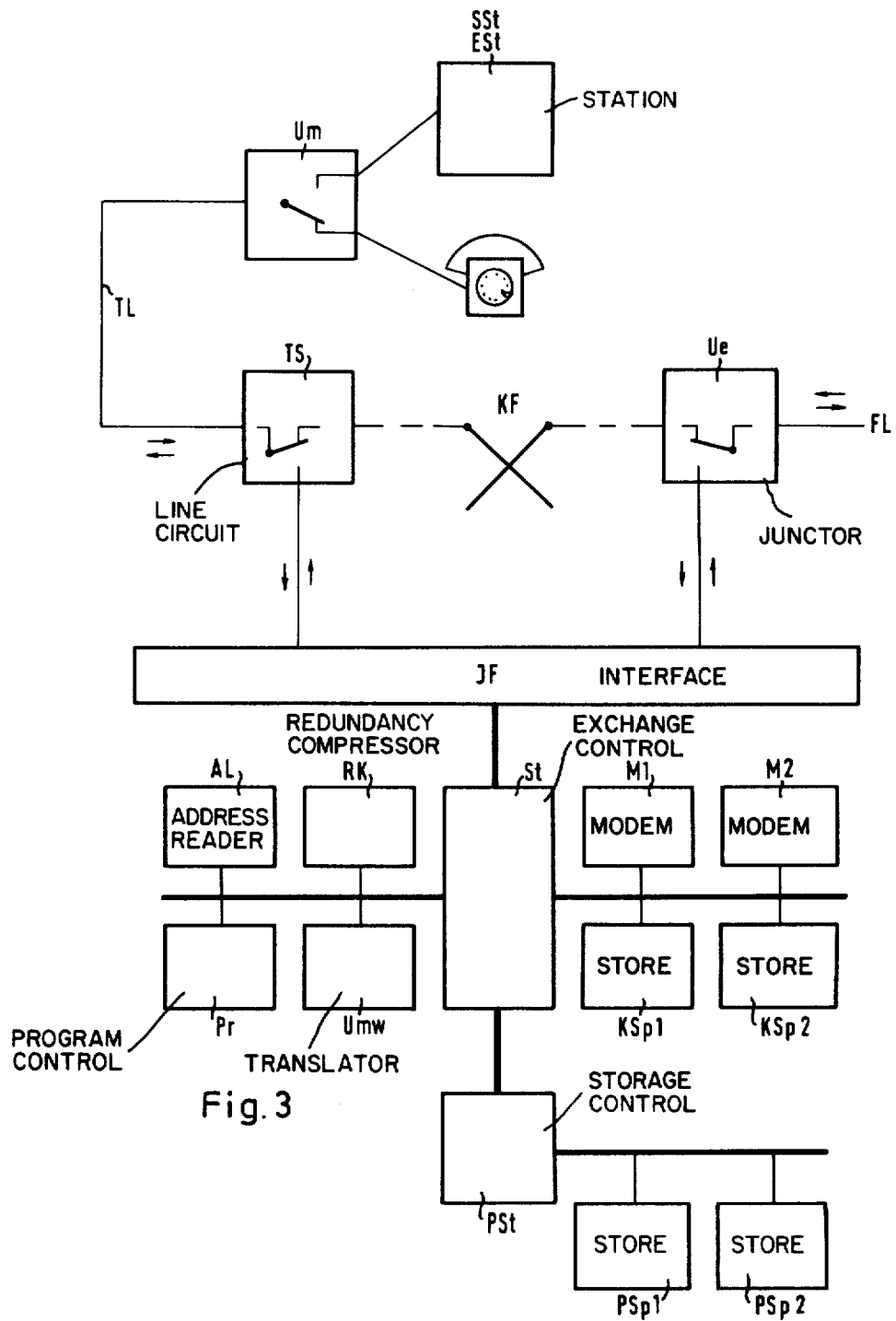

AUTOMATIC MAIL SENDING SYSTEM

To send mail automatically, it is known to sort letters put into special mailboxes according to their destinations after the mailboxes have been cleared. At the dispatch post office, the letters for one place of destination are opened in a machine, "read" electronically, and transmitted as electronic pulses over a coaxial cable or by radio to the post office of destination. At the post office of destination, an exact copy of the original communication is formed from these pulses, which is folded by machine, put in an envelope and sealed. For the pulse transmission, it is also possible, of course, to use a transmission path employing communication satellites. This system was in operation between Washington, Chicago and Battle Creek (Michigan) ("Fernmeldepraxis" 1961, pp. 210 and 933-937).

This system, which is usable only for particular destination, needs a high-quality communications link and still requires some personnel for clearing the special mailboxes and for sorting the mail according to destinations.

The invention has for its object to provide an automatic mail sending system which is not limited to particular directions and requires even less personnel. The invention is characterized in that exchanges of a switching network have letter sending devices connected thereto each of which is equipped with an apparatus for receiving sheets of note paper up to a predetermined size, with starting means which cause a storage in the associated exchange to be seized and, after successful seizure of a storage, turn on electrooptical scanning means for scanning the information contained on the sheet of note paper, and with sending means for transmitting the scanned information to the storage in the exchange, that, at determinable times, control means cooperating with the storage evaluate a destination address associated with the entered information belonging to the respective sheet of note paper, send out the control information necessary for the establishment in the switching network of a connection to a destination corresponding to the destination address, and transmit the associated stored information over the connection then established, and that each destination is allotted a letter receiving device which contains reproducing means for reproducing the letter in permanent visible form. This offers the advantage that the existing public telephone network can be utilized.

An improvement of the invention is characterized in that the traffic carried by the telephone network is continuously checked, and that the setting-up of the paths is initiated if traffic falls below a predetermined value, or set-up paths are disconnected if the predetermined value is exceeded. This has the advantage that the telephone network, designed to handle the telephone traffic during the peak periods of a day (busy hour) can be additionally utilized during times of little traffic. Thus, a network need not be expanded for the additional transmission of mail.

Another improvement of the invention is characterized in that a redundancy reduction is carried out in the exchange before the information is stored. This has the advantage that the transmission time can be shortened.

Another improvement of the invention is characterized in that, after the setting-up of a path to a destination, further information with the same destination address is read from the storage and transmitted over the set-up path. This has the added advantage that repeated establishment of connections to one and the same destination can be dispensed with.

The invention will now be explained in more detail with reference to the accompanying drawings, showing, by way of example, a preferred embodiment of the invention, and wherein:

FIG. 3 is a block diagram showing the equipment in an exchange.

Figure 1:
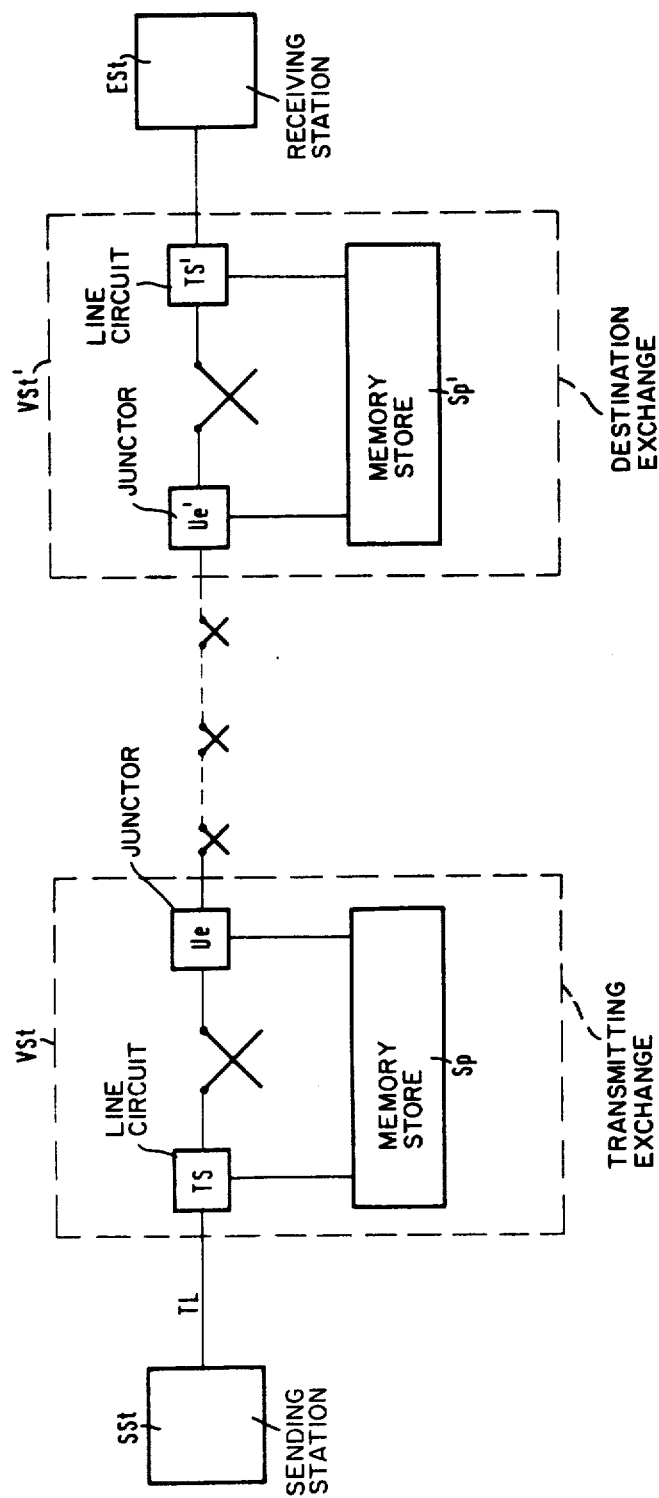
FIG. 1 is a general representation of the network.

In the system shown in FIG. 1, a plurality of sending stations SST are connected via subscriber lines TL to subscriber line circuits TS in the associated telephone exchange. The sender must write his letter on a standardized sheet of note-paper and specify therein the destination address at a definite point. A sending station which may be employed herein is manufactured by the Ampex Corporation and known as the Ampex Video File system, a known digitally accessed information storage and retrieval system. The line circuit TS as used herein may be of the type shown in German Pat. No. 909,947 with a final issue date of Apr. 26, 1954.

The sender then puts this uncovered sheet of paper in the sending station and pays the fee. Further details will be explained below with reference to the other figures. The sending station contains a television camera, which scans the sheet and transmits the information to the storage system Sp in the exchange VSt. Having stored the information in proper manner, the storage system sends an acknowledgement signal back to the sending station SSt, where the sheet is provided with a receipt indication and returned to the sender. The sending station is now available for the further transmission of letters.

Of the letter information stored in the storage system Sp, the destination address is then evaluated during times of little traffic, preferably at night, and a corresponding path is set up to an exchange VSt' associated with the place of destination; the stored information is then transmitted to the storage Sp' of this exchange where it is temporarily stored; then it is transmitted to the desired receiving station ESt. By suitable organization of the destination addresses it is also possible to transmit the information directly to the receiving station. On the other hand, however, it is also possible to pass on the information on the well-known principle of telex store-and-forward type exchanges. A combination of direct dialing and store-and-forward type exchange is possible, too. At the receiving station ESt the information is reproduced in known manner, electromagnetically or electrostatically. To observe the privacy of letters, these reproductions must now be sealed automatically. This may be done by putting them in window envelopes. The reproductions sealed in this way are then delivered to the addressees by the personnel of the post office.

Since the sending stations replace the mailboxes, they are preferably installed in or at coin telephone booths or in post offices in suitable numbers. Furthermore, senders with a large letter volume may have sending stations installed at their own offices.

If the introduced Zip code is used as the destination address, all mail intended for one destination will arrive at one point. It is possible, however, to extend this Zip code by one or more places; in this case, receiving stations in the respective delivery post offices can be selected directly. It is also possible to allot addressees receiving a large amount of mail an expanded destination address of their own and to install a receiving station at their offices. In these receiving stations, the sealing of the mail received may be dispensed with.

Figure 2:
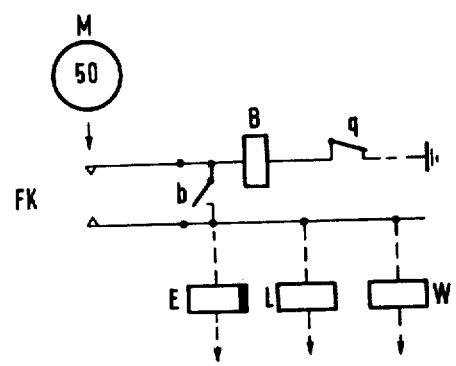
FIG. 2 shows details of the control at the sending station.
Figure 2:
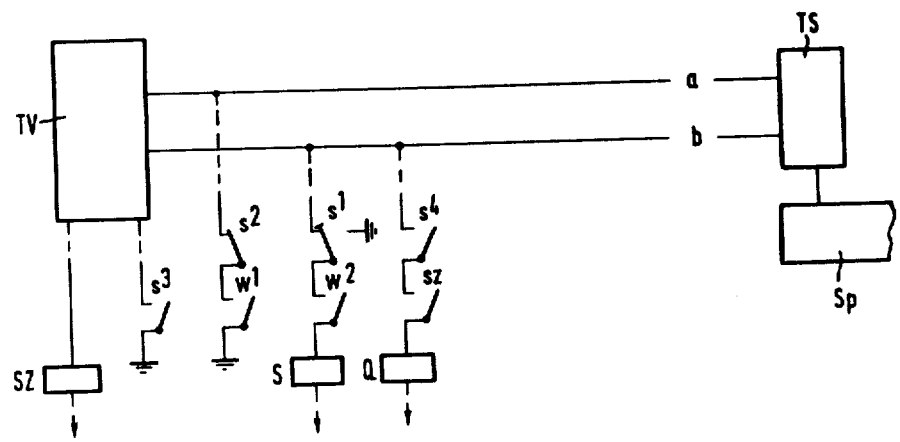

FIG. 2 shows schematically details of the control of a sending station. In this sending station, the input of sheets of note-paper is blocked by a flap until the postage has been paid by insertion of cash. Having been checked for authenticity and correctness in known manner, an inserted coin M actuates a sensing contact FK which closes an operating circuit for an occupation relay B which then holds itself via its own contact b. Also energized in this circuit are a magnet E for unlocking the input, a relay L for turning on the lights, and a relay W for controlling the photoelectric recognition of a mark provided at a definite point in the sheet of paper. The letter can now be put in. With its contact w1 the relay W completes a request circuit via the a-wire to the letter storage in the exchange if the mark recognition device in the sending station SSt has determined that the letter was put in correctly. If the letter storage is vacant, it will return a ground pulse over the b-wire, and at the sending station the start relay S now responds via the operated contact w2 and then holds itself via its operated contact s1. The request circuit is opened with the contact s2, and the camera tube TV is turned on with the contact s3; the camera tube can now scan and transmit the letter illuminated by the lamps already turned on. After the letter has been scanned, the clearing-signal relay Sz picks up and prepares the circuit for the acknowledgement relay Q. When all information has been stored in the exchange, and if a check has shown that the destination address is capable of being evaluated, the relay Q operates; it controls the printing of a receipt indication on the sheet of note-paper which indication, if stamps are used, cancels the latter and, as the contact q opens, places all actuated switching means in the normal position. The receipted sheet of note-paper is then given out again and can be used by the sender as a voucher. If the letter was inserted improperly, or the combination of numbers could not be recognized completely, etc., no receipt is given and the sender is thus asked to repeat the input operation in the correct manner.

If sending stations are provided at offices, the coin collection is replaced by a counting mechanism as is used in franking machines, for example. In this case, the opening of the input flap can be made dependent on the connection of the counting mechanism.

It is also possible to pay the postage only by machine-recognizable and -defaceable marks or only by insertion of coins. A combination of coin insertion and mark has the advantage that the collecting device need not be changed in case of changes in the rate of postage. It is then sufficient to change the recognition circuit for the mark values, which is accomodated in the storage device.

The sending station SSt may be connected directly via a subscriber line TL or, as in the case of a two-party line, via a changeover switch Um (FIG. 3) to a subscriber circuit TS in the exchange.

If the subscriber line is seized by the sending station SSt, changeover is effected in the subscriber line circuit TS to an interface IF. If a core storage, e.g. KSp1, is vacant, the starting pulse explained hereinabove is transmitted to the sending station, which now begins the line-by-line scanning. The received information is written into the core storage KSp.

At a definite point in the letter format, the storage KSp expects the destination address in the form of an electronically readable number combination of different length. The storage receives the address, also resolved into picture elements. These picture elements, transmitted in defined lines from the television camera at the sending station to the storage and corresponding to the number combination representing the address, are compared in an address reader AL with a preprogramed "number mirror" and recognized and evaluated as a complete address. A reader as usable herein is one introduced by Recognition Equipment, Inc. for facsimile systems in 1972 or earlier. In this publicized approach, Recognition Equipment was said to have demonstrated the possibility of substituting an EDP input for the scanner portion of an OCR device by programming a small computer to convert the output of a facsimile scanner to the form required by the recognition unit of an OCR page reader. Only if the result is positive does the storage KSp store the rest of the letter completely and is the receipt of the letter acknowledged by transmitting a signal to the sending station. This signal initiates the operations already described with reference to FIG. 2.

The letter stored in the core storage KSp is then reduced in a redundancy compressor RK by the redundancy contained therein and is subsequently stored together with the destination address in a magnetic disc storage PSp1 or PSp2 via the disc control PSt. These magnetic disc storages are mass storages which are capable of storing the volume of letters mailed in the area of the exchange in one day. All operations are controlled with a control unit St in the exchange. A redundancy compressor usable herein may be that shown and described in German Pat. No. 2,031,646 dated Jan. 14, 1971 as filed by D. R. Weber and assigned to Dacom, Inc.

During times of little traffic, preferably at night, the stored information is transmitted to the destinations. If a Zip code is given as the destination address, it is first translated, in a translator Umw, to the corresponding call number. Under the control of the program control device Pr, a path is then set up to the desired destination via the interface IF and the junctor Ue, and the stored information is transmitted. By suitable organization in the magnetic disc storage it is possible to read and transmit all information intended for one and the same destination successively after a path has been set up. This results in a sort of "mailbag formation". Depending on the letter volume for individual destinations, it is also possible to set up several paths simultaneously. As seen in FIG. 3, the functions of the Exchange Control (ST), and the Program Control (PR) may be performed by any one of a number of small computers such as the IBM 3704 or 3705; the IBM 370 Model 145; the Digital Equipment PPP8; or the General Automation SPC-16. The interface (IF) shown in FIG. 3, may be any well-known Input/Output control as described in brochures such as that of the IBM 2703, the General Automation SPC-16, the Digital Equipment M Series Modules for Computer Interfacing, or the Digital Equipment M7389, a synchronous Transceiver of the M series interface units.

As a rule, the information is passed through modems M1, M2. At the place of destination the incoming "letters" are stored in the magnetic disc storages ESt1 of the exchange and then transmitted to the receiving station ESt, or the receiving station can be dialed direct, with the switching grid being set by the call number.

If traffic falls below predetermined values, traffic-metering devices connected to groups of directional lines of the exchange can send a signal to the storage system. The transmission of "letters" in that direction is then started, and "letters" provided with a special "express" indication are transmitted first. Analogously, a transmission will be interrupted if traffic exceeds a predetermined value.

The letters, printed and sealed at the post office delivery stations during the same day on which they were mailed or during the night and possibly in the early morning hours, are then delivered to the addressees.

What is claimed is:

1. Apparatus adapted to provide letter mail service through a multiple exchange telecommunications switching network, including a plurality of sending and receiving stations, each station being associated with a telecommunications exchange of said network and coupled thereto over telephone lines, each station including means for receiving a letter in the form of at least one sheet of paper containing information including a letter message and destination address, means at a station for validating input conditions for said letter for signalling the associated exchange accordingly, means at said exchange responsive to said signal at one station for seizing a path over one of said telephone lines to idle memory means in its associated exchange in response to a letter placed therein, means at said station for reading the message and for sending said message to said associated exchange over said path, a memory store in the memory means of said associated exchange for storing the address and message information read from said letter, means operative on a request and responsive to stored address information for completing respective telecommunications paths through the switching network to destination exchanges represented by a portion of the respective stored address information, means for transmitting said stored message and address information for all letters from said sending exchange to the respective destination exchanges, means at the respective destination exchanges for storing said received message and address information within a memory store, means for reading said received message and address information from said last-mentioned memory store, and means at a receiving station associated with said destination exchange for printing each message and address read from said store as letter information on a sheet of paper.

2. Apparatus as claimed in claim 1, wherein said means for reading the message at said one station comprises electro-optical scanning means activated to read the message from said letter sheet.

3. Apparatus as claimed in claim 2, wherein said one station includes check controlled means responsive to sensing of cash for activating said electro-optical scanning means.

4. Apparatus as claimed in claim 1 including means for sensing the presence of a letter at said station in position for reading by said electro-optical scanning means, said letter-sensing means operative on the sensing of a letter for causing the read-out of said message for transmission.

5. Apparatus as claimed in claim 4, wherein said one station further includes means responsive to storage of the message information for producing a receipt for said letter.

6. An electronic letter service system including letter sending devices each connected to a center via a line, each said device being equipped with an apparatus for receiving sheets of letter paper up to a predetermined size, means responsive to a signal from said apparatus for activating a path to said center, electrooptical scanning means in each device for reading information contained on a sheet of letter paper inserted in said device, switching means controlled responsive to information read from the letter for transmitting said information to the center, storage means at said center in which letter information including a destination address received from a letter sending device connected to the center is stored for subsequent transmission at a convenient time, and receiving devices at other centers in said network capable of being reached from said first-mentioned center via further lines and containing means for reproducing the letters directed to that other center in permanent visible form, the invention in which each center is incorporated in a telephone exchange of a telephone network and utilizes normal components of the exchange thereof, that the letter sending devices are connected to the first-mentioned center via telephone lines of the type used for telephone subscribers, control switching means of said network cooperative with the storage means to evaluate on an individual basis the respective destination addresses stored as part of the stored letter information for transmitting the respective control information necessary to set up a path in the telephone network to a telephone center corresponding to the evaluated destination address, and means for causing the associated stored information to be transmitted over the setup telephone path to receiving devices in a telephone center corresponding to the destination address for recording the received information thereat.

* * * * *